US005492780A

United States Patent [19]

Okada

[11] Patent Number: 5,492,780

[45] Date of Patent: Feb. 20, 1996

[54] BATTERY TERMINAL CLAMP

[75] Inventor: Hajime Okada, Yokkaichi, Japan

[73] Assignee: Sumitomo Wiring Systems, Ltd., Yokkaichi, Japan

[21] Appl. No.: 243,107

[22] Filed: May 16, 1994

[30] Foreign Application Priority Data

May 31, 1993 [JP] Japan .............................. 5-028812 U

[51] Int. Cl.[6] ...................................................... H01M 2/20

[52] U.S. Cl. ........................... 429/121; 439/765; 439/768

[58] Field of Search ............................ 429/121; 439/765, 439/768

[56] References Cited

U.S. PATENT DOCUMENTS

| | | | |
|---|---|---|---|
| 1,332,482 | 3/1920 | Baker | 429/121 |
| 1,661,375 | 3/1928 | Leighton . | |
| 2,085,229 | 6/1937 | Peterson | 429/121 |
| 2,870,426 | 1/1959 | Haegert | 439/765 |
| 4,042,759 | 8/1977 | Cella | 429/121 |
| 4,747,793 | 5/1988 | Fukuda et al. | 439/766 |
| 5,290,646 | 3/1994 | Asao et al. . | |
| 5,302,142 | 4/1994 | Tabata . | |
| 5,302,143 | 4/1994 | Inoue et al. . | |

FOREIGN PATENT DOCUMENTS

| | | |
|---|---|---|
| 52517 | 4/1945 | France . |
| 47567 | 2/1992 | Japan . |

OTHER PUBLICATIONS

European Search Report and Annex. Sep. 1994.

An English Language translation of pertinent portions of Japanese Patent No. 4–7567. (Feb. 1992).

*Primary Examiner*—Stephen Kalafut

*Attorney, Agent, or Firm*—Sandler, Greenblum, & Bernstein

[57] ABSTRACT

A battery terminal clamp that clamps firmly to the battery post by tightening a bolt from the horizontal direction to improve the productivity of the bolt tightening operation. The battery terminal clamp has, on a terminal clamp main body, a ring-shaped post fitting member continuous to the cable fitting member, and a pair of right and left tightening members continuous to the respective free ends of the post fitting member and having a gap therebetween. The tightening members are brought together by a nut and bolt to close the free ends of the post fitting member continuous thereto, thus clamping the battery terminal to the outside circumference of the battery post. The pair of right and left tightening members projecting from the post fitting member are provided at a rising slope of a predetermined angle to the post fitting member. A vertical bearing plate is provided on the outside surface of the upward-projecting part of each of the right and left tightening members, and a bolt is passed through the bolt hole of the bearing plate at a position above the terminal main body for tightening in the horizontal direction.

4 Claims, 3 Drawing Sheets

BATTERY TERMINAL CLAMP

BACKGROUND OF THE INVENTION

1. Field of the Invention

The present invention relates to a battery terminal clamp mounted to the post of a battery mounted in a motor vehicle, and relates particularly to a battery terminal clamp wherein the tightening position of the bolt is placed above the terminal main body, and the battery terminal clamp is firmly clamped to the battery post by tightening said bolt from the horizontal direction.

2. Description of the Prior Art

A conventional battery terminal clamp of this type is shown in FIG. 4. A ring-shaped post fitting member 3*a* is fit over the battery post projecting from the battery, and right and left tightening members 3*c* are provided continuous to the free ends of the post fitting member 3*a* and projecting horizontally therefrom. A bolt 4 is passed horizontally through the right and left tightening members 3*c,* and is tightened using an impact wrench or similar tool from the side (horizontal direction) to close the tightening members 3*c* and thus clamp the post fitting member 3*a* to the battery post.

A modified battery terminal clamp of this type has been proposed (Japanese Utility Model Publication examined No. 4-7567) and is shown in FIG. 5. With this battery terminal clamp, a base member 3*b* and tightening member 3*c* are provided in mutual opposition and at an angle to the axis of the post fitting member 3*a* of the terminal 3. A bolt 4 is placed in the bolt holes provided in the base member 3*b* and tightening member 3*c,* and thus at an angle to the axis of the post fitting member 3*a,* and a nut 6 is tightened onto the bolt 4 by means of an impact wrench 5 held at an angle above the terminal 3 assembly to clamp the post fitting member 3*a* to the battery post.

Space inside the engine room of most recent vehicles, however, is limited due to the large number of engine room components. This makes it difficult to adequately tighten the terminal fitting by applying a horizontal force from a point near the battery top with a battery terminal as shown in FIG. 4 because of interference between other engine room components and the impact wrench. It is even possible for the impact wrench to contact the negative terminal while tightening the positive terminal fitting, causing an electrical short.

With a conventional battery terminal clamp as shown in FIG. 5, the base member 3*b* and tightening member 3*c* are formed by twisting them to an angle relative to the axial direction of the post fitting member 3*a* so that the nut 6 can be tightened from a position above and at an angle to the terminal 3. However, because the tightening direction of the base member 3*b* and tightening member 3*c* formed by twisting to an angle and the direction in which the post fitting member 3*a* is clamped to the outside circumference of the battery post differ, sufficient tightening force cannot be applied in the clamping direction of the post fitting member 3*a.*

SUMMARY OF THE INVENTION

Therefore, an object of the present invention is to provide a battery terminal clamp whereby the bolt can be tightened to the battery terminal clamp from the horizontal direction at a height not interfering with other components, and can therefore firmly clamp the battery terminal clamp to the battery post.

To achieve this object, a battery terminal clamp according to the present invention comprises on the terminal main body a ring-shaped post fitting member continuous to the cable fitting member, a pair of right and left tightening members continuous to the respective free ends of the post fitting member and having a gap therebetween, and a nut and bolt whereby the tightening members are brought together to close the free ends of the post fitting member continuous thereto, thus clamping the battery terminal to the outside circumference of the battery post on the battery in the vehicle. This battery terminal clamp is characterized by placing the pair of right and left tightening members at a rising slope of a predetermined angle from the post fitting member, providing a vertical bearing plate on the outside surface of the upward-projecting part of each of the right and left tightening members, and passing a bolt through the bolt hole of the bearing plate at a position above the terminal main body for tightening from the horizontal direction.

In this battery terminal clamp, the right and left tightening members are connected to each other by means of the identically shaped top and bottom members of the end curved member and the bearing plate.

In addition, when the bolt is passed through the bearing plate, the shank of the bolt is parallel to the direction in which the free ends of the post fitting member close.

With a battery terminal clamp according to the present invention as thus described, the right and left tightening members are provided at a rising angle above the post fitting member, and the bolt is tightened to the battery terminal clamp using an impact wrench from the horizontal direction at a position above the tightening members, i.e., at a position above the top of the battery. As a result, placing the impact wrench horizontally to the battery terminal clamp does not interfere or cause contact with other engine room components.

In addition, because the bolt is tightened from a horizontal position, the tightening force is reliably transferred to the free ends of the post fitting member connected to the right and left tightening members, and the free ends can therefore be dependably closed.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
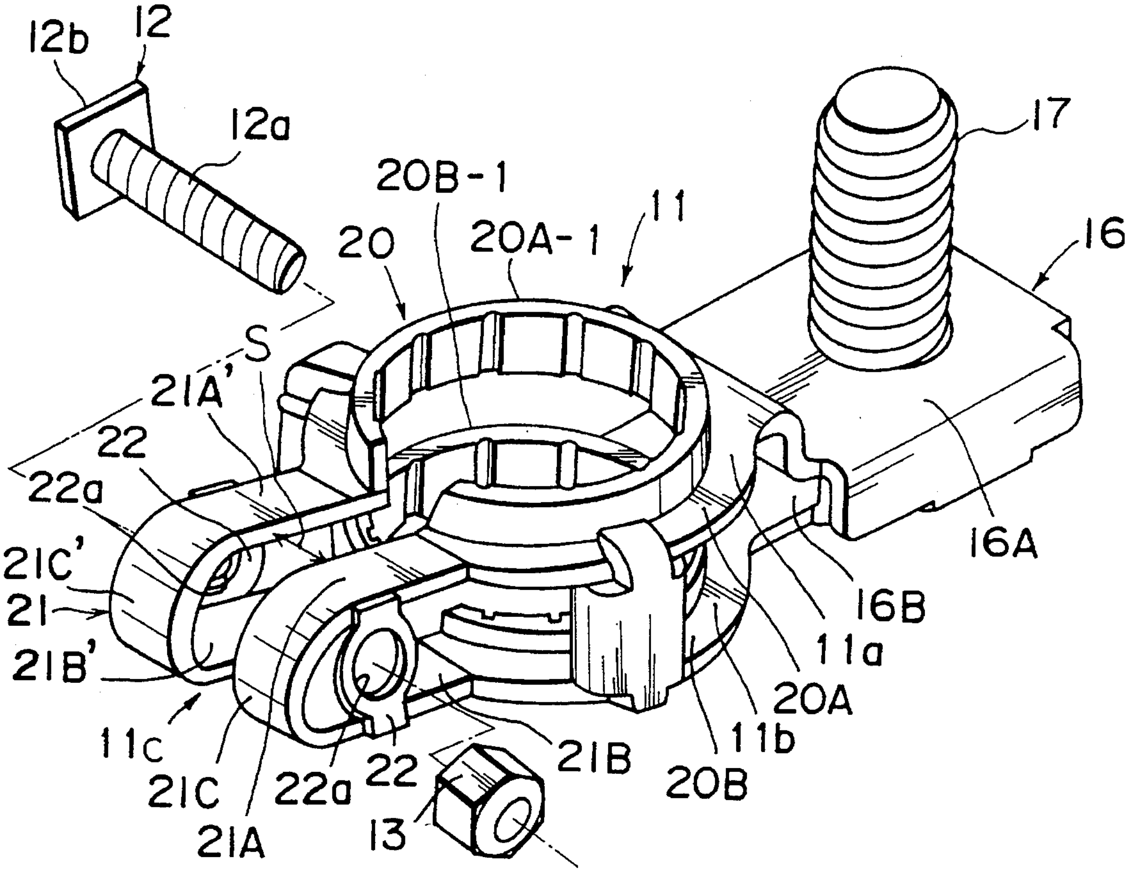
FIG. 1 is a partially exploded overview of a battery terminal clamp according to the present invention.

Referring to FIG. 1, a battery terminal clamp 10 according to the present invention is shown which comprises a terminal main body 11, bolt 12, and nut 13 as shown in FIG. 1.

The terminal main body 11 is formed by shaping and bending a single metal plate in two as shown in the figure. A stud bolt 17 projects from the cable connecting member 16 at one end of the terminal main body 11, and the terminal clamp (not shown in the figures) crimped to the cable is connected to the cable connecting member 16 by tightening a nut (not shown in the figures) onto the stud bolt 17.

A top member 11*a* and bottom member 11*b*, essentially identical in shape, are bent around curved member 11*c* at one end of the terminal clamp main body 11 and positioned in vertical opposition to each other, thus forming cable connecting member 16, post fitting member 20, and tightening members 21.

More specifically, rectangular cable connecting members 16A and 16B are formed at one end of the top member 11*a* and the bottom member 11*b*, and ring-shaped post fitting members 20A and 20B are formed towards the middle of the terminal main body 11 from the cable connecting members 16A and 16B. Cylindrical members 20A-1 and 20B-1 are placed vertically along the inside circumference of the post fitting members 20A and 20B.

The ends of the post fitting members 20A and 20B are open as shown in the figure, and the tightening members 21A, 21A', 21B, 21B', 21C, 21C' continuous to the free ends are provided projecting in the same direction. The beams 21A, 21B and 21C arranged in U-shape configuration define a first tightening member and the beams 21A', 21B' and 21C' also arranged in U-shape configuration define a second tightening member.

Figure 2:
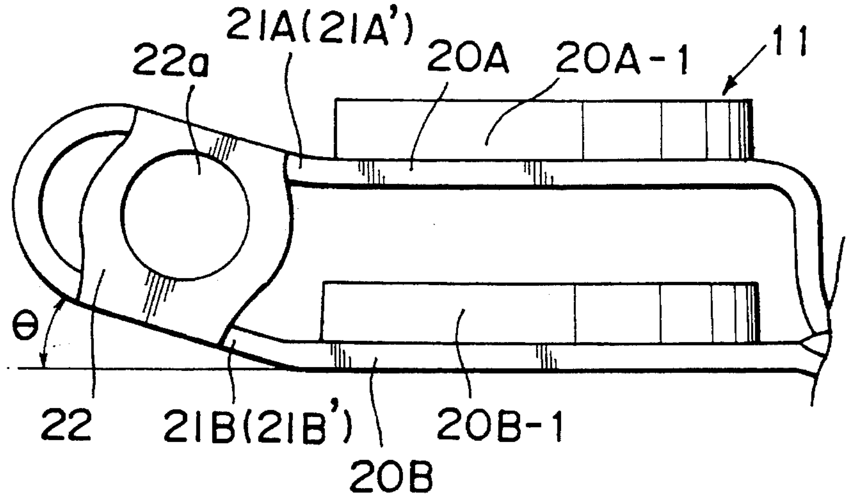
FIG. 2 is a side view showing a portion of the terminal main body.

As shown in FIG. 2, these tightening members 21A, 21A', 21B, 21B' slope up from the ends connected to the post fitting members 20A and 20B towards the end of the tightening members 21A–21B' at a predetermined angle θ.

At an upward sloping position, the outside faces of the beams 21A and 21B of the right tightening member are connected by vertical bearing plate 22, and so are the beams 21A' and 21B' of the left tightening member. A bolt hole 22*a* is provided in the center of each of the bearing plates 22, which are parallel to each other.

As shown in FIG. 1, the bolt head 12*b* is a flat rectangular piece at one end of the shank 12*a*.

Before the battery terminal 10 is mounted to the battery post 2, the shank 12*a* of the bolt 12 is inserted to the left bearing plate 22 and out through the right bearing plate 22 such that the bolt 12 is horizontal and parallel to the closing direction of the free ends. The nut 13 is then threaded onto the shank 12*a* projecting from the bearing plate 22, and lightly tightened.

The process of clamping the battery terminal clamp 10 thus comprised to the battery post is described below.

After being assembled as described above, the battery terminal clamp 10 is fit down onto the battery post 2.

Because there is a gap S between the right and left tightening members 21A, 21B and 21A', 21B' when the nut 13 is lightly tightened as described above, the free ends of the post fitting member 20 of the terminal clamp main body 11 continuous to these right and left tightening members are open wide. As a result, the battery terminal clamp 10 can be easily fit to the battery post 2.

Figure 3:
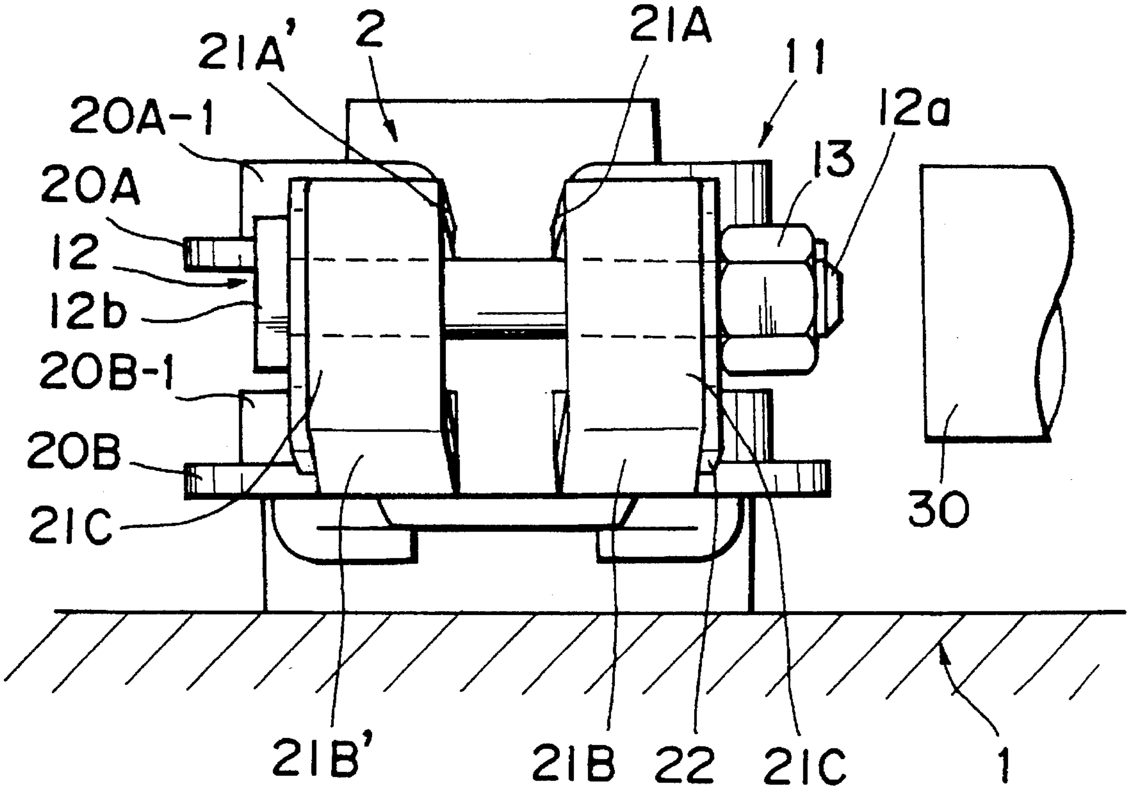
FIG. 3 is an end view of the terminal main body when fit to the battery post before fully tightening the nut.
Figure 4:
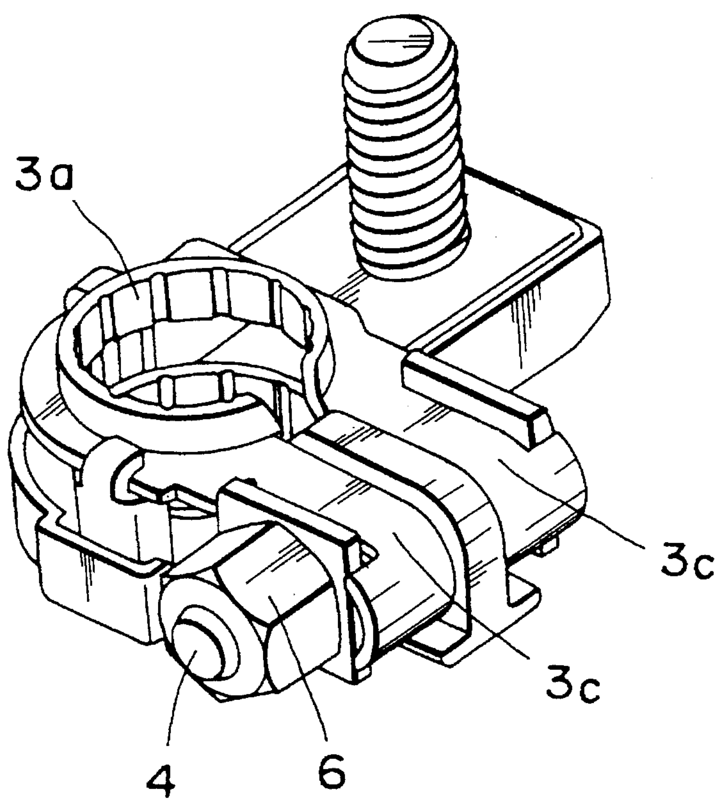
Fig. 4 PRIOR ART
FIG. 4 is an overview of a prior art battery terminal clamp.
Figure 5:
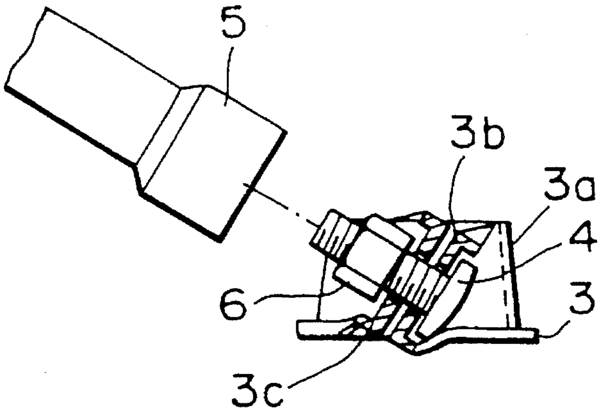
Fig. 5 PRIOR ART
FIG. 5 is a side view of another prior art battery terminal clamp.

As shown in FIG. 3, an impact wrench 30 or other tightening tool is then fit from the horizontal direction onto the nut 13 to tighten the nut 13 and thereby move the right and left tightening members 21A, 21B and 21A', 21B' closer together toward the inside.

Because the tightening members 21 of the terminal main body 11 are raised from the horizontal position at an angle θ, the nut 13 is positioned above with a gap to the top of the battery 1. As a result, the impact wrench 30 positioned in-line with the nut 13 will be also positioned above with a gap to the top of the battery 1, will not contact the other battery post projecting from the top of the battery 1, and therefore will not cause an electrical short. The impact wrench 30 also does not contact any other components.

When the nut 13 is tightened, the right and left tightening members 21A, 21B and 21A', 21B' move closer together, and the free ends of the post fitting members 20A and 20B connected to the tightening members 21A–21B' are closed together. As a result, the inside faces of the cylindrical members 20A-1 and 20B-1 are clamped against the outside circumference of the battery post 2.

Because the bolt 12 is passed horizontally through the bearing plates 22 of the right and left tightening members of the terminal main body 11, and the bolt 12 is thus parallel to the direction in which the free ends of the post fitting member 20 connected to the tightening members 21A–21B' close together, the tightening force of the nut 13 threaded onto the bolt 12 against the right and left tightening members is transferred directly to the free ends of the post fitting member 20. The free ends are thus moved together, and the contact pressure of the post fitting member 20 clamps the battery terminal clamp 10 firmly to the battery post 2.

As will be known from the above description of the invention, right and left tightening members projecting from the post fitting member are provided at a predetermined angle rising up from the post fitting member. A bolt is then passed horizontally through the bearing plates placed in this upward rising part, and a nut is tightened onto the bolt using an impact wrench. As a result, the impact wrench is at the same height as the bolt, and is positioned above the battery with a gap between the impact wrench and the battery top.

Contact between the impact wrench and the other battery post projecting up from the battery is thus reliably prevented. Interference between the impact wrench and other engine room components is also prevented because the impact wrench is operated at a position above the normal working position required with a conventional battery terminal.

Furthermore, the bolt tightening force is also reliably transferred to the free ends of the post fitting member continuous to the tightening members because the nut tightening direction is parallel to the direction in which the free ends are closed, and the battery terminal clamp can thus be reliably clamped to the battery post.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery terminal clamp for clamping a battery post, comprising:

a cable fitting member for connecting a cable;

a ring-shaped post fitting member continuous to said cable fitting member and being opened to define free ends having a gap therebetween, said ring-shaped post fitting member having a first substantially straight portion;

first and second tightening members continuous to said free ends, respectively, said first and second tightening members having second substantially straight portions disposed at an angle from said first substantially straight portion;

first and second vertical bearing plates on the outside surface of said first and second tightening members, each of said first and second vertical bearing plates having a bolt hole; and a nut and bolt extending through said bolt holes, whereby the tightening members are brought together to close the free ends, thus clamping the battery terminal to the outside circumference of the battery post.

2. A battery terminal clamp as claimed in claim 1, wherein each of said first and second tightening members is formed by a U-shaped member having two beams.

3. A battery terminal clamp as claimed in claim 2, wherein each of said first and second bearing plates is connected between said two beams.

4. The battery terminal clamp of claim 1, wherein said cable fitting member, said ring-shaped post fitting member, and said tightening members are aligned in a plane.

* * * * *